(12) United States Patent
Chalmers et al.

(10) Patent No.: US 6,184,985 B1
(45) Date of Patent: *Feb. 6, 2001

(54) SPECTROMETER CONFIGURED TO PROVIDE SIMULTANEOUS MULTIPLE INTENSITY SPECTRA FROM INDEPENDENT LIGHT SOURCES

(75) Inventors: Scott A. Chalmers, La Jolla; Randall S. Geels, San Diego, both of CA (US)

(73) Assignee: Filmetrics, Inc., San Diego, CA (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/209,358

(22) Filed: Dec. 11, 1998

(51) Int. Cl.⁷ .............................. G01J 3/18; G01B 11/06
(52) U.S. Cl. ...................... 356/381; 250/559.27; 356/328
(58) Field of Search ..................................... 356/326, 328, 356/330–334, 381, 382; 250/559.27

(56) References Cited

U.S. PATENT DOCUMENTS

| | | |
|---|---|---|
| 3,532,429 | * 10/1970 | Hughes et al. . |
| 3,880,524 | 4/1975 | Dill et al. . |
| 3,985,447 | 10/1976 | Aspnes . |
| 4,320,971 | * 3/1982 | Hashimoto et al. . |
| 4,494,872 | * 1/1985 | Busch . |
| 4,555,767 | 11/1985 | Case et al. . |
| 4,948,259 | 8/1990 | Enke et al. . |
| 4,983,039 | * 1/1991 | Haroda et al. . |
| 4,984,894 | 1/1991 | Kondo . |
| 5,166,755 | * 11/1992 | Gat . |
| 5,227,861 | 7/1993 | Nishizawa et al. . |
| 5,337,150 | 8/1994 | Mumola . |
| 5,416,594 | 5/1995 | Gross et al. . |
| 5,450,205 | 9/1995 | Sawin et al. . |
| 5,587,792 | 12/1996 | Nishizawa et al. . |
| 5,642,196 | 6/1997 | Alves et al. . |
| 5,643,044 | 7/1997 | Lund . |
| 5,646,734 | 7/1997 | Venkatesh et al. . |
| 5,658,183 | 8/1997 | Sandhu et al. . |
| 5,663,797 | 9/1997 | Sandhu . |
| 5,667,424 | 9/1997 | Pan . |
| 5,685,766 | 11/1997 | Mattingly et al. . |

OTHER PUBLICATIONS

McGeorge "Imaging . . . Future" Spectroscopy, vol. 2, No. 4 1987 p. 1–6.*

* cited by examiner

Primary Examiner—F. L. Evans
(74) Attorney, Agent, or Firm—Howrey Simon Arnold & White, LLP

(57) ABSTRACT

A spectrometer for providing multiple, simultaneous spectra from independent light sources is described characterized in that light from the multiple sources is directed to different portions of a diffraction grating, and the wavelength components of the resultant spectra are directed to at least one receptor.

20 Claims, 8 Drawing Sheets

SPECTROMETER CONFIGURED TO PROVIDE SIMULTANEOUS MULTIPLE INTENSITY SPECTRA FROM INDEPENDENT LIGHT SOURCES

I. BACKGROUND OF THE INVENTION

This invention relates generally to the field of spectrometers, and more specifically, to a spectrometer which is configured to provide simultaneous, multiple intensity spectra from independent light sources.

In many applications, it is desirable to be able to measure the thickness of a film at more than one location simultaneously. One such application is the manufacture of digital video disks (DVD) in which simultaneous measurement of film thickness over the surface of the disk helps to ensure a high degree of uniformity of film thickness in the final manufactured product. Another example is the manufacture and processing of semiconductor wafers. There, it is frequently desirable to deposit, using chemical vapor deposition (CVD) or the like, a film onto a substrate or a multi-film or patterned sample, or polish, using chemical mechanical planarization (CMP) or the like, an existing film on such a sample, such that the film has a high degree of uniformity in thickness.

Optical techniques for measuring the thickness of thin films by employing the reflectance spectra of light reflected from the film are detailed in the following co-pending U.S. patent applications, filed on even date herewith and having a common assignee with the subject application, each of which is hereby incorporated by reference herein as though set forth in full: 1.) "RAPID AND ACCURATE THIN FILM MEASUREMENT IN A NOISY ENVIRONMENT," U.S. patent application Ser. No. 09/210,148, "RAPID AND ACCURATE END POINT DETECTION IN A NOISY ENVIRONMENT," U.S. patent application Ser. No. 09/210,140; and 3.) "RAPID AND ACCURATE THIN FILM MEASUREMENT OF INDIVIDUAL LAYERS IN A MULTI-LAYERED OR PATTERNED SAMPLE," U.S. patent application Ser. No. 09/209,357. According to these techniques, reflected light from the film to be measured is passed through a spectrometer which dissects the reflected light into its constituent wavelengths. That it to say, it provides the intensity spectrum of the reflected light. A bank of photodetectors, which are frequently part of the spectrometer but can be independent thereof, receives the intensity spectrum, and provides an electrical signal for each wavelength of interest in which a parameter of the signal, most frequently amplitude, is representative of the intensity of the reflected light at that wavelength. A processor coupled to the photodetectors receives the electrical signals and, responsive thereto, determines a digitized version of the intensity spectrum, and then a thickness spectrum responsive to the digitized intensity spectrum. In one embodiment, the thickness spectrum is the Power Spectral Density (PSD) of the digitized intensity spectrum. In this embodiment, the estimated thickness of the film is taken to be the thickness corresponding to a selected peak of the PSD.

A problem thus arises because conventional spectrometers are capable of providing at a time the intensity spectrum of light reflected from only one portion of the surface of the film of interest. They are thus incapable of providing multiple simultaneous intensity spectra of light reflected from multiple portions of the surface of the film as required. Moreover, it is generally considered infeasible to use multiple conventional spectrometers in parallel, or alternatively, an optical multiplexor to allow sharing of a single spectrometer by multiple light sources, to provide the multiple simultaneous reflectance spectra as required.

Accordingly, there is a need for a spectrometer capable of providing multiple simultaneous intensity spectra from independent sources.

II. SUMMARY OF THE INVENTION

In accordance with the purpose of the invention as broadly described herein, there is provided, in one embodiment, a spectrometer comprising: a plurality of slits; a diffraction grating arranged along a plurality of first optical paths extending from each of the slits to the diffraction grating, such that light passing through each of the slits travels along at least one of the first optical paths and impinges upon the diffraction grating to form a spectrum of wavelength components; and at least one receptor arranged along at least one second optical path extending from the diffraction grating to the at least one receptor, such that each of the spectra travels along the at least one second optical path and impinges upon the at least one receptor.

Related other apparatus embodiments and methods are also provided.

III. BRIEF DESCRPTION OF THE DRAWINGS

Figure 1:
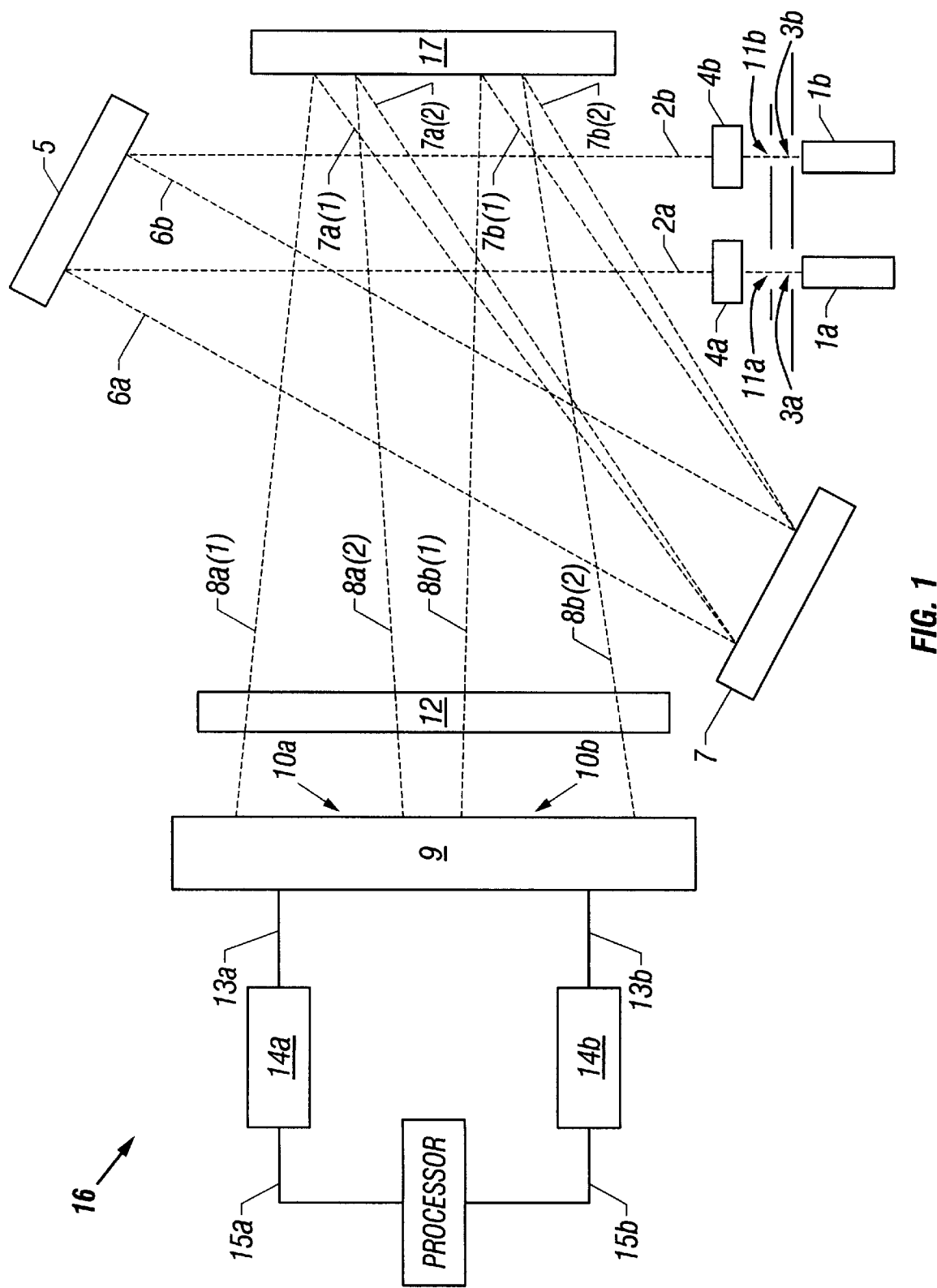
FIG. 1 illustrates a first embodiment of a spectrometer of the subject invention.
Figure 3A:
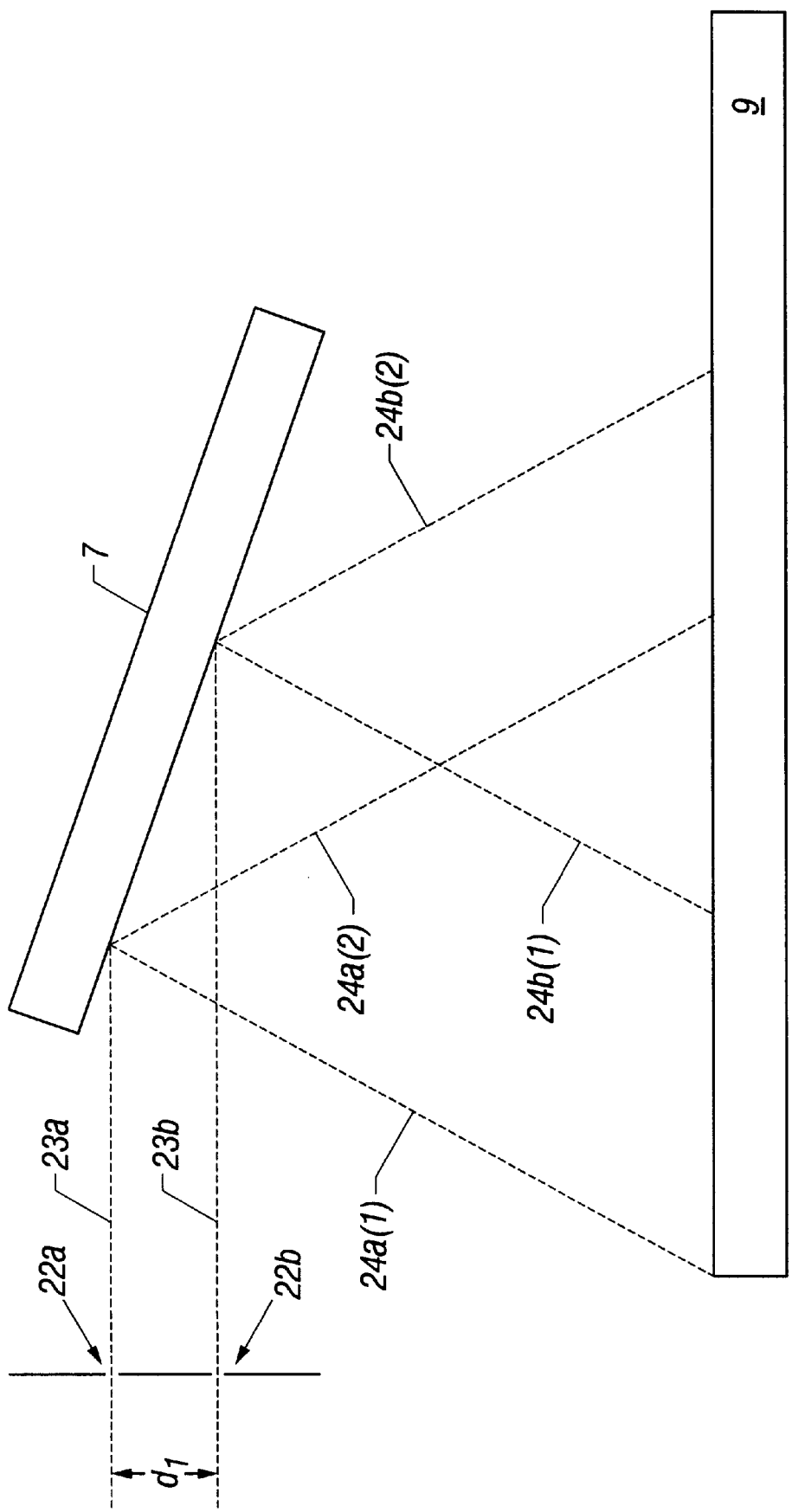
Figure 3B:
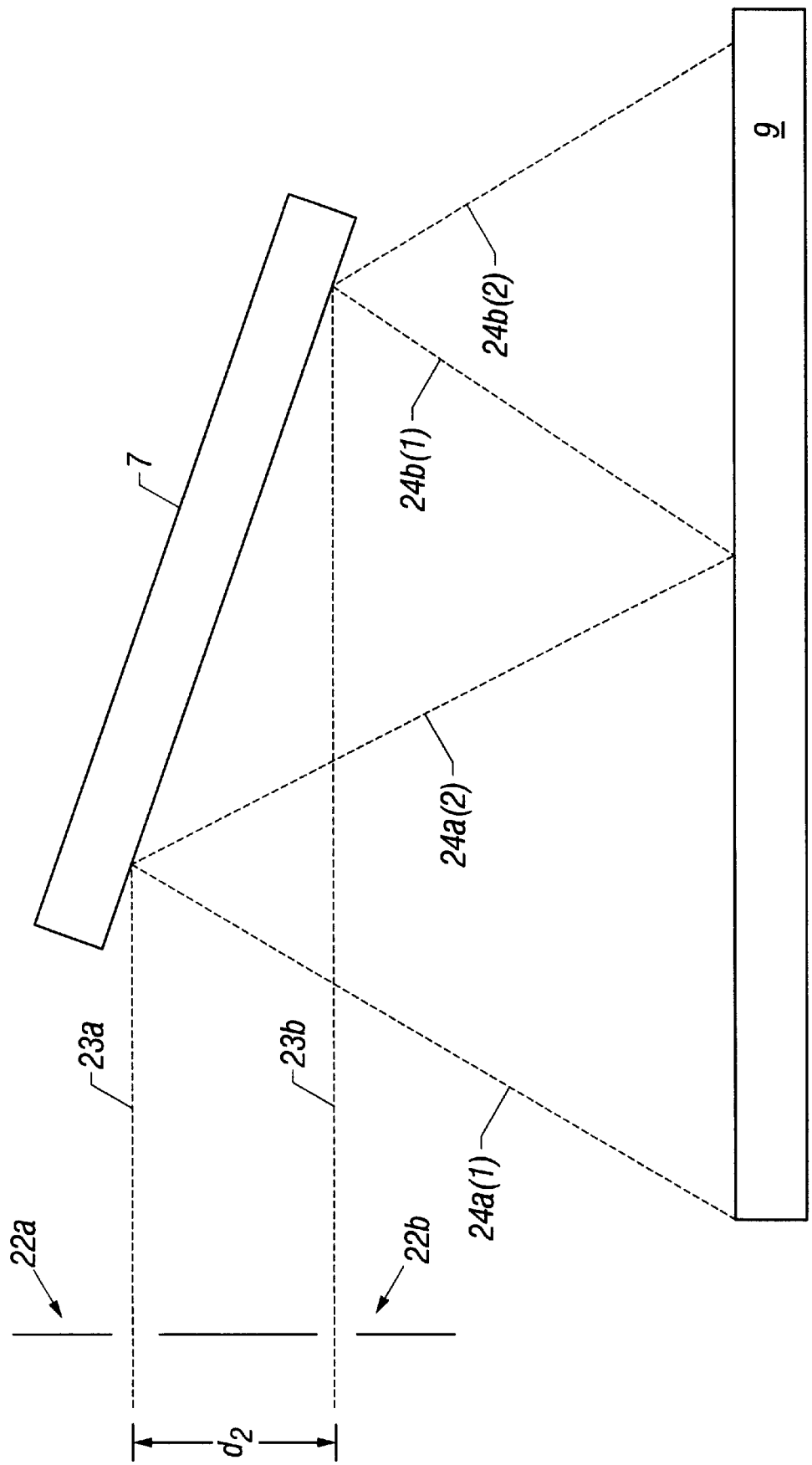
Figure 3C:
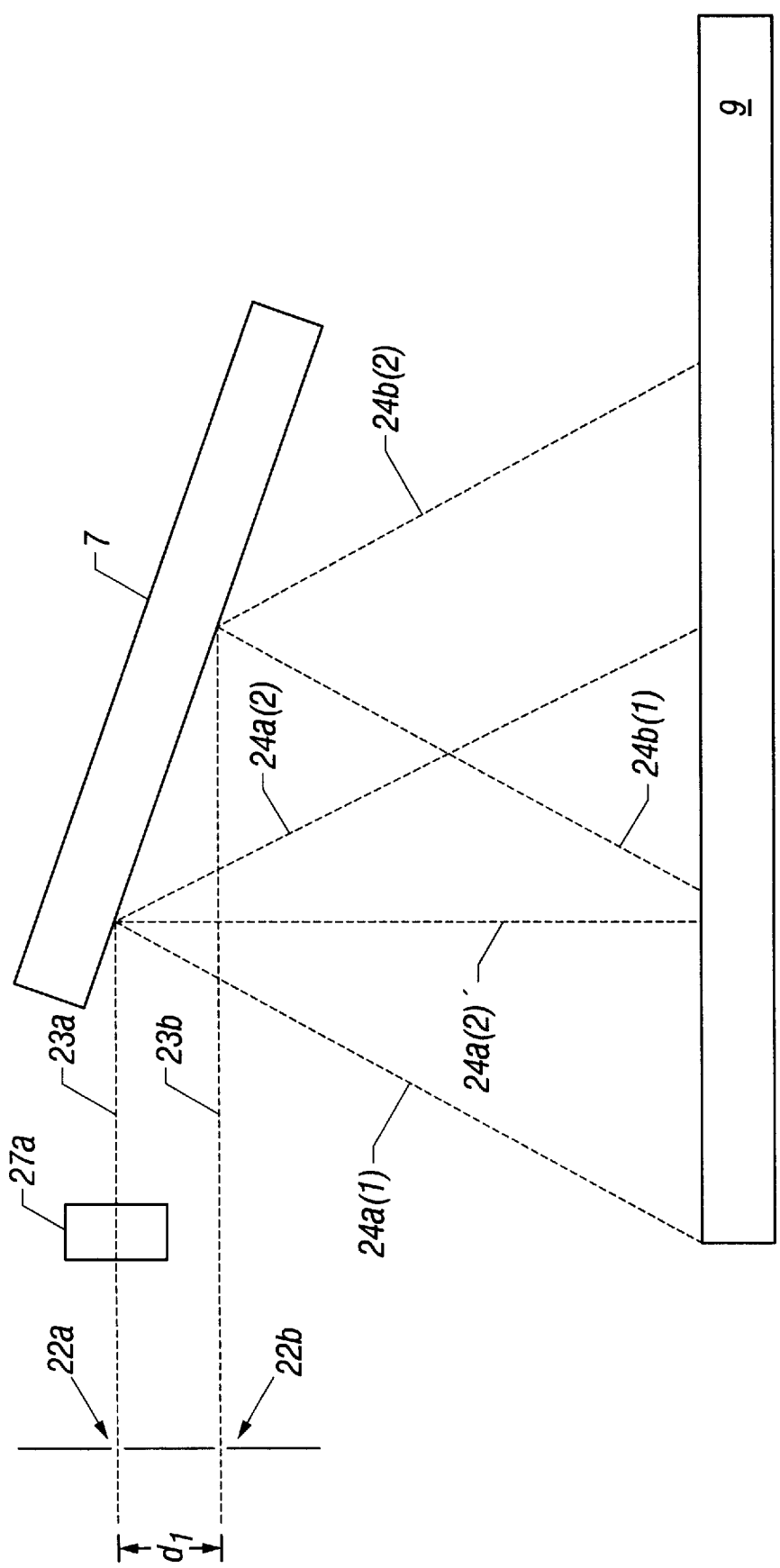
Figure 3D:
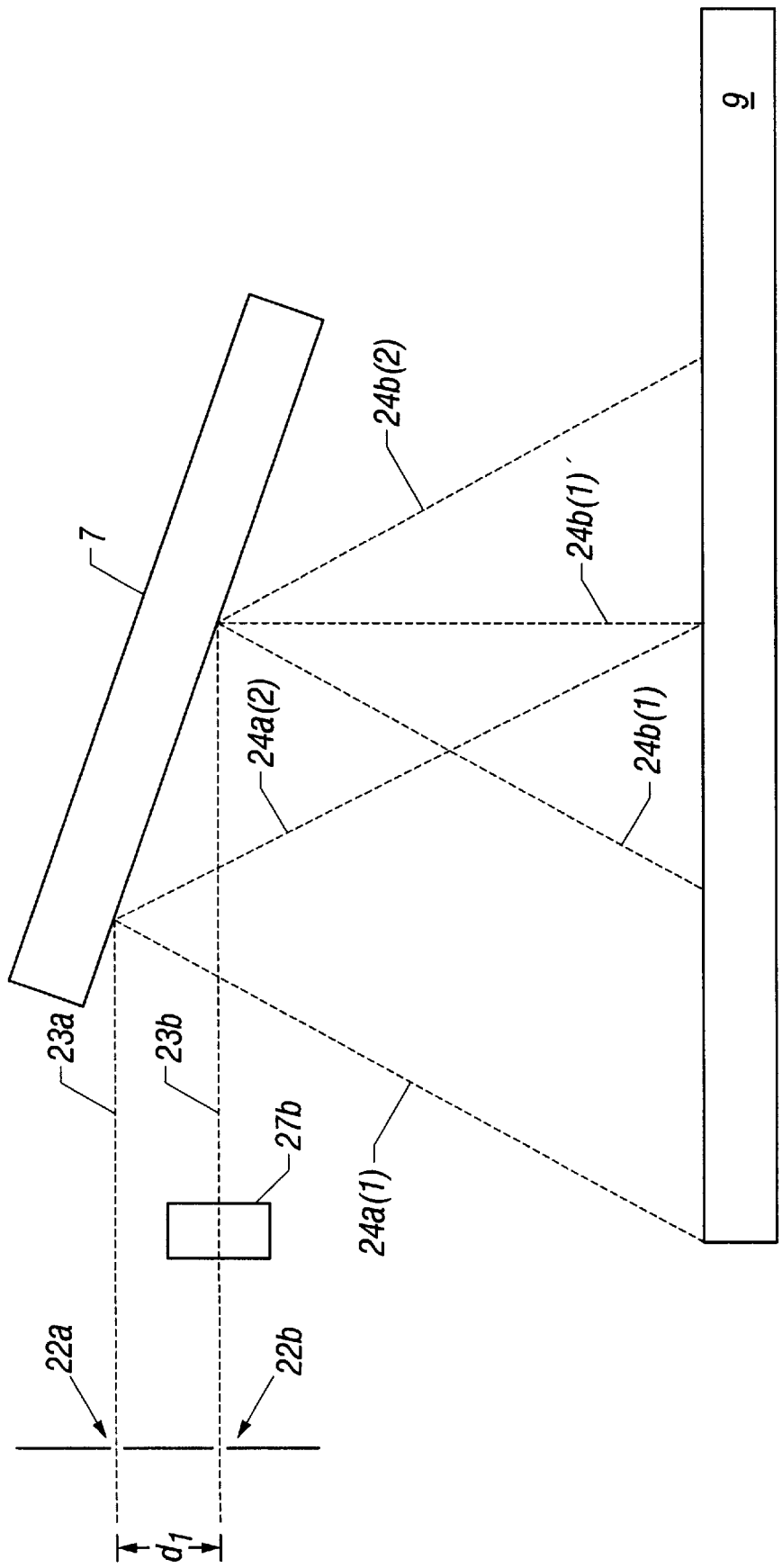
Figure 4:
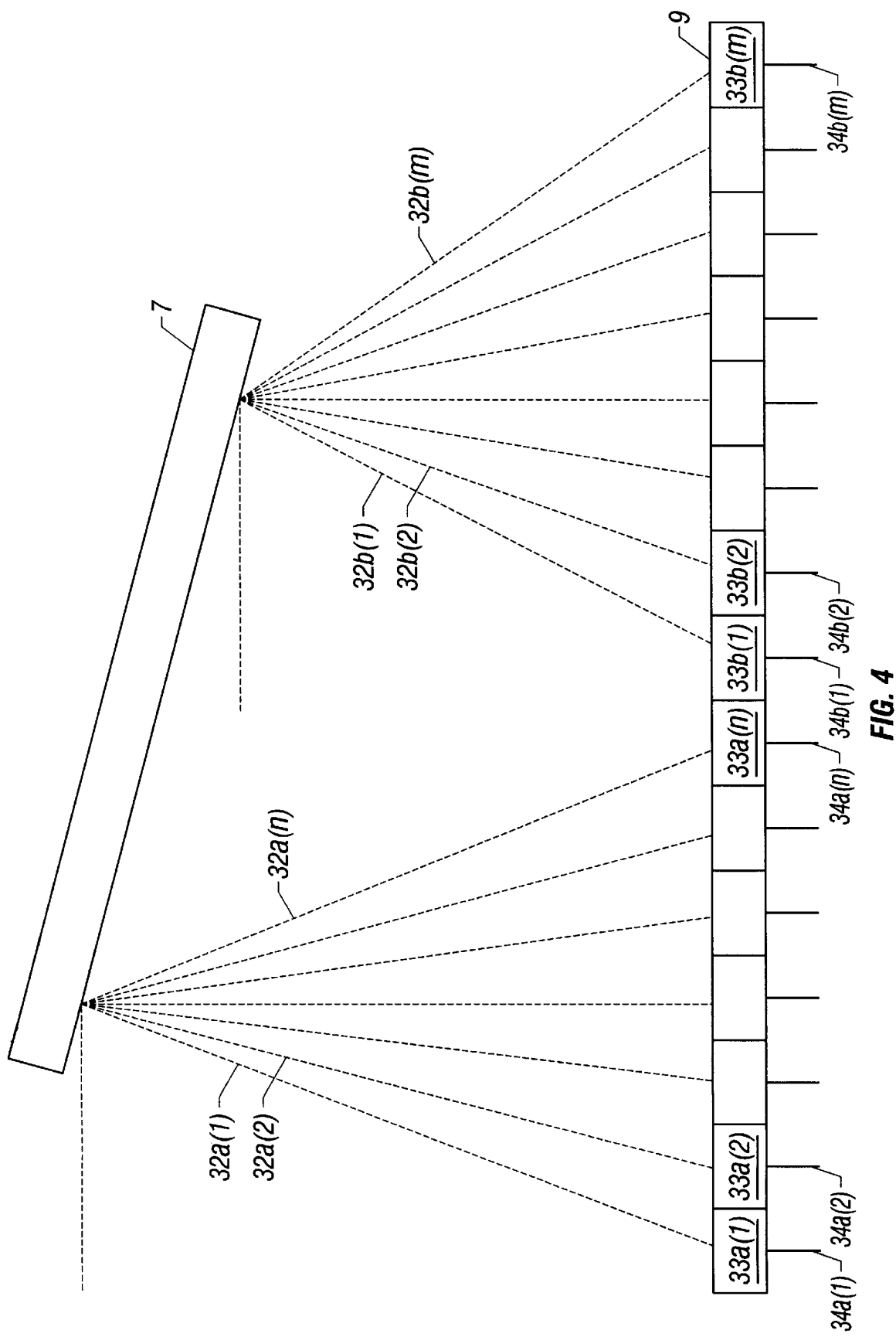
Figure 5:
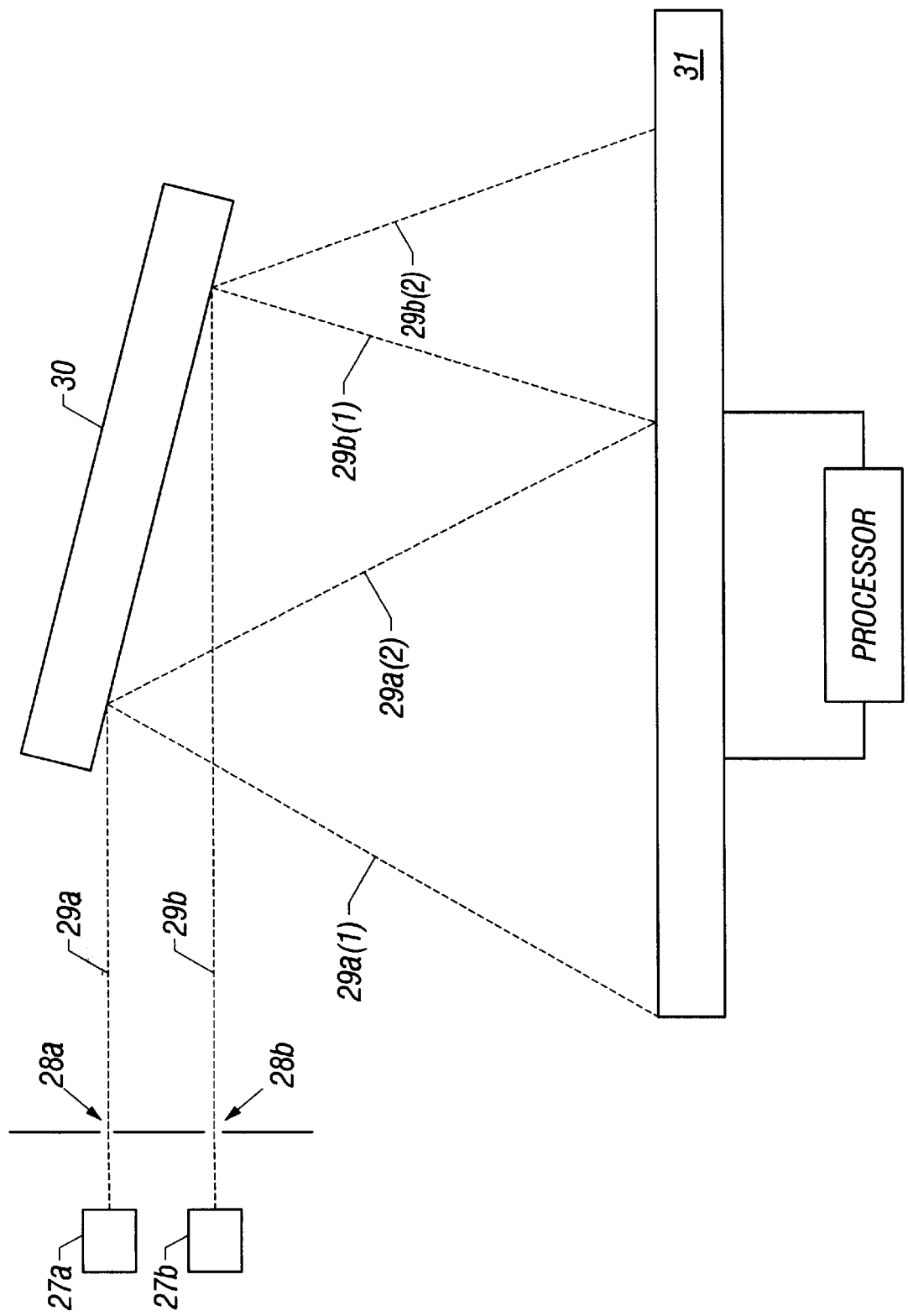

FIGS. 3(a) and 3(b) illustrate an embodiment of the subject invention in which the distance be slits is increased to avoid substantial overlap of the spectra of the various light sources;

FIGS. 3(c) and 3(d) illustrate an embodiment of the subject invention in which filtering avoids substantial overlap of the spectra of the various light sources;

FIG. 4 illustrates an implementation example of the photodiode array of FIG. 1; and FIG. 5 illustrates a second embodiment of a spectrometer of the subject invention.

IV. DESCRIPTION OF THE PREFERRED EMBODIMENTS

An embodiment of a spectrometer 16 in accordance with the subject invention is illustrated in FIG. 1. The purpose of the spectrometer is to simultaneously dissect light from multiple, independent sources into its constituent wavelengths. For purposes of illustration only, two sources 1a and 1b are shown in FIG. 1, but it should be appreciated that the subject invention may be beneficially employed with more than two light sources. In addition, it should be appreciated that the light sources themselves are not part of the spectrometer of the subject invention, and are shown in FIG. 1 simply for purposes of explanation. Finally, it should be appreciated that any source of light is possible for use in the subject invention, including electromechanical sources such as a tungsten-halogen lamp, or a passive source, such as reflected from multiple locations of a thin film. Typically, the source of light is a white light source, or other source of light having constituent wavelengths over a wavelength region of interest.

Spectrometer 16 is configured to dissect light from each of the sources 1a, 1b into its constituent wavelengths, which are hereinafter referred to with the symbol λ. With reference to FIG. 1, an embodiment of spectrometer 16 comprises, for each incident source of light 1a, 1b, a slit 3a, 3b, and an aperture 11a, 11b. Thus, in FIG. 1, for source 1a, corresponding slit 3a and aperature 11a are provided, and for source 1b, corresponding slit 3b and aperature 11b are provided.

Also provided are filter 4, collimating mirror 5, diffraction grating 7, focusing mirror 17, focusing lens 12, photodiode array 9, and digitizers 14a and 14b. In this embodiment, these elements are generally arranged relative to one another in the manner shown. Advantageously, each of the slits 3a, 3b is a 10 μm. slit, but it should be appreciated that other dimensions are possible. Filters 4a, 4b are optionally provided to eliminate selected constituent wavelengths of light from either of sources 1a, 1b if, for example, they fall out outside the region of interest, or if they are undesirable for any other reason, such as the risk that they will interfere with the wavelength region of interest from the other light sources. If such is not needed, then filters 4a, 4b can be eliminated. It should also be appreciated that the filters, if provided, need not be part of spectrometer 16, and can be moved outside the spectrometer. In one implementation, for example, they are combined with light sources 1a, 1b.

The collimating mirror 5 and aperatures 11a, 11b are advantageously aligned with one another so that the beams 2a, 2b which are respectively emitted from aperatures 11a, 11b respectively bisect collimating mirror 5 in the manner shown. In addition, collimating mirror 5 is advantageously a highly polished precision mirror configured to direct each of the beams 2a, 2b onto diffraction grating 7. In FIG. 1, beam 2a reflects off of collimating mirror 5 to form beam 6a which impinges onto diffraction grating 7, and beam 2b reflects off of collimating mirror 5 to form beam 6b which impinges onto diffraction grating 7.

Diffraction grating 7 is advantageously a glass or polished metal surface having a large number of very fine parallel grooves or slits cut into the surface thereof. Preferably, the diffraction grating divides each of the beams 6a, 6b into its constituent wavelengths. This process is depicted in FIG. 1 by showing each beam incident to diffraction grating 7 being divided up to form multiple light beams, each at a different wavelength. Thus, in FIG. 1, beam 6a is shown being divided into beams 7a(1) and 7a(2), and beam 6b is shown being divided into beams 7b(1) and 7b(2). The beams 7a(1) and 7a(2) form a first intensity spectrum and beams 7b(1) and 7b(2) form a second intensity spectrum.

Opposite the diffraction grating 7 is a focusing mirror 17, configured to receive the first and second light spectra from diffraction grating 7, and direct the same to focusing lens 12. The focusing mirror 17 is configured to maintain the integrity of each of the first and second spectra. This is depicted in FIG. 1 by showing each of the wavelength constituents for each of the spectra being maintained after reflection from focusing mirror 17. Thus, in FIG. 1, beams 7a(1), 7a(2) each reflect off focusing mirror 17 to respectively form beams 8a(1) and 8a(2), and beams 7b(1), 7b(2) each reflect off focusing mirror 17 to respectively form beams 8b(1) and 8b(2).

The focusing lens 12 is advantageously configured to substantially evenly spread each of the light spectra onto photodiode array 9. The photodiode array 9 comprises a plurality of photodiodes which function as receptors. Advantageously, one or more such receptors are provided for each frequency or frequency band of interest. Each receptor is a photodiode comprising a two electrode radiation sensitive junction formed of a semiconductor material in which the reverse current varies with the incident illumination.

Preferably, the foregoing elements are configured so that the incident spectra impinge upon photodiode array 9 in distinct areas which do not substantially overlap. Thus, in FIG. 1, the spectrum comprising beams 8a(1) and 8a(2) is directed to impinge upon photodiode array 9 in area 10a, and the spectrum comprising beams 8b(1) and 8b(2) is directed to impinge upon photodiode array 9 in area 10b which does not substantially overlap area 10a.

In certain cases, the spacing between the slits for each of the light sources is the critical variable to control in order to prevent substantial overlap of the spectra from the various sources. This can be explained with reference to FIGS. 3(a) and 3(b), in which compared to FIG. 1, like elements are referred to with like identifying numerals. FIGS. 3(a) and 3(b) illustrate a simplified form of the configuration of FIG. 1, that is, without collimating mirror 5, focusing mirror 17, and focusing lens 12. According to this simplified configuration, light 23a, 23b from two sources respectively passes through slits 22a, 22b spaced by a distance $d_1$. The light impinges upon diffraction grating 7 and is dispersed by wavelength λ. In the example shown, the lower frequency light is assumed to be dispersed to the left, while the higher frequency light is assumed to be dispersed to the right. Thus, in FIG. 3(a), light 24a(1) is assumed to be a lower frequency component of incident light 23a, such as red light, and light 24a(2) is assumed to be a higher frequency component of incident light 23a, such as blue light. Similarly, light 24b(1) is assumed to be a lower frequency component of incident light 23b, such as red light, and light 24b(2) is assumed to be a higher frequency component of incident light 23b, such as blue light.

As can be seen, in FIG. 3(a), the distance $d_1$, between the slits is such that light 24a(2), the higher frequency component of light 23a, overlaps or intersects with light 24b(1), the lower frequency component of light 23b. Thus, the distance between the slits must be increased, if possible, to avoid substantial overlap between light 24a(2) and light 24b(1).

The situation in which it is possible to increase this distance sufficiently is illustrated in FIG. 3(b). There, as can be seen, by increasing the spacing between the slits to $d_2$, the light 24a(2) no longer substantially overlaps the light 24b(1).

In some cases, it may not be possible or it may be undesirable to increase the spacing between the slits sufficiently to avoid substantial overlap of the spectra. One example of such a scenario is the case in which the dimensions of the grating 7 do not permit a sufficient increase in the distance between slits. In this event, one or more filters can be employed to avoid substantial overlap of the spectra.

The situation is illustrated in FIGS. 3(c) and 3(d), in which, compared to FIGS. 3(a) and 3(b) and also FIG. 1, like elements are referenced with like identifying numerals. In FIG. 3(c), to avoid substantial overlap of the spectra, a low pass filter 27a is introduced in the optical path of beam 23a. Such a filter has a characteristic cutoff frequency such that light having a frequency below the cutoff frequency is allowed to pass, while light having a frequency above the cutoff frequency is blocked. The characteristic frequency of the filter 27a is the frequency of component 24a(2)'. As can be seen, through introduction of the filter, the frequency components of light 23a having a frequency greater than the frequency of component 24a(2)', that is, the components between light 24a(2)' and 24a(2), are blocked, and the spectra from light 23a is reduced to the light between beams 24a(1) and 24a(2)'. Note that this configuration is only possible in the case in which the frequency components between 24a(2)' and 24a(2) are not within the frequency components of interest.

As an alternative to the configuration of FIG. 3(c), the configuration of FIG. 3(d) can be employed to substantially avoid substantial overlap of the spectra of light 23a and 23b. According to this configuration, a high pass filter 27b is inserted along the optical path of light 23b. The high pass filter has a characteristic cutoff frequency such that light having frequencies below this cutoff frequency are blocked while light having frequencies at or above the cutoff frequency are allowed to pass. In FIG. 3(d), the characteristic frequency of filter 27b is the frequency of component 24b(1)'. Through introduction of this high pass filter, as can be seen, light from beam 23b having frequencies below 24b(1)', that is between 24b(1) and 24b(1)', are blocked, while frequencies from 24b(1)' to 24b(2) are allowed to pass.

Thus, in FIG. 3(d), the spectra of light 23b is reduced from 24b(1)-24b(2) to 24b(1)'-24b(2), and substantial overlap with the spectra from light 23a, that is, 24a(1)-24a(2), is avoided. Note that this configuration is only possible in the case in which the eliminated frequencies, 24b(1)-24b(1)', are not within the wavelength region of interest.

Based on the foregoing, with reference to FIG. 1, it should be appreciated that embodiments are possible in which either or both of filters 4a, 4b are provided to bandlimit one or both of light 2a, 2b to avoid substantial overlap between the spectra 8a(1)-8a(2), 8b(1)-8b(2) impinging on grating 7. In these embodiments, the filters can be high pass filters, low pass filters, or bandpass filters depending on the specific application. Further, it should be appreciated that embodiments are possible in which these filters are avoided because the distance between slits 3a, 3b can be increased sufficiently to avoid substantial overlap of the spectra.

The output of the photodiode array 9 is, for each spectrum, a plurality of electrical signals, with one such signal advantageously provided for each of the frequency or frequency bands of interest and which is representative of the intensity of the incident light at the frequency or frequency band of interest. In FIG. 1, the electrical signals corresponding to the first spectrum, the one impinging on area 10a, are accessible on signal line 13a, and the electrical signals corresponding to the second spectrum, the one impinging on area 10b, are accessible on signal line 13b. For purposes of illustration, each of signal lines 13a, 13b is depicted as a single line, but it should be appreciated that, in practice, each of these signal lines may comprise one or a plurality of lines depending on whether a parallel or serial interface to digitizers 14a, 14b is desired. Advantageously, the interface is parallel, so that each of lines 13a, 13b is implemented with a plurality of lines, one for each of the frequency or frequency bands of interest.

FIG. 4 illustrates an example embodiment of photodiode array 9. According to this example, two spectra are directed towards photodiode array 9 from grating 7. The first spectrum comprises frequency components 32a(1), 32a(2),..., 32a(n), and the second spectrum comprises frequency components 32b(1), 32b(2),..., 32b(m). The array comprises a plurality of receptors which can be classified into two groups, one for each of the spectra. The first group comprises receptors 33a(1), 33a(2),..., 33a(n), and the second group comprises receptors 33b(1), 33b(2),..., 33b(m). Each group of receptors is arranged such that a frequency components in the corresponding spectrum impinges on a corresponding one of the receptors in the group. Thus, as can be seen in FIG. 4, component 32a(1) impinges onto receptor 33a(1), component 32a(2) impinges onto receptor 33a(2), component 32a(n) impinges onto receptor 33a(n), component 32b(1) impinges onto receptor 33b(1), component 32b(2) impinges onto receptor 33b(2), and component 32b(m) impinges onto receptor 33b(m).

Each of the receptors in this embodiment has a corresponding signal line on which is placed a value representing the intensity of the light component which is incident on the receptor. Thus, in FIG. 4, signal line 34a(1) corresponds to receptor 33a(1), signal line 34a(2) corresponds to receptor 33a(2), signal line 34a(n) corresponds to receptor 33a(n), signal line 34b(1) corresponds to receptor 33b(1), signal line 34b(2) corresponds to receptor 33b(2), and signal line 34b(m) corresponds to receptor 33b(m).

It should be appreciated that photodiode array 9 may be replaced with a single receptor in the case in which diffraction grating 7 is a rotating diffraction grating. In that event, each spectra is swept past the receptor, and values representative of the intensity values of the wavelength components of the spectra are successively output in serial fashion on a signal line coupled to the receptor. It should also be appreciated that photodiode array 9 may be replaced with another light receptor array such as a CCD array.

It should also be appreciated that, for purposes of this disclosure, the term "receptor" is not limited to a photodiode receptor but includes any device capable of providing an electrical signal representative of the intensity of light incident upon the receptor.

With reference to FIG. 1, digitizers 14a and 14b are provided to digitize the signals provided on signal lines 13a, 13b. Digitizer 14a provides on signal line 15a the digitized values determined responsive to the electrical signals provided on signal line 13a, and digitizer 14b provides on signal line 15b the digitized values determined responsive to the electrical signals provided on signal line 13b. Again, for purposes of illustration, each of signal lines 15a, 15b is depicted as a single line, but it should be appreciated that, in practice, each of these signal lines may comprise one or a plurality of lines depending on whether a serial or parallel output interface is desired. Advantageously, the interface is parallel, so that each of lines 15a, 15bis implemented with a plurality of lines, one for each of the frequency or frequency bands of interest.

A method of operating the spectrometer 16 is as follows. Light 2a from light source 1a passes through the slit 3a and aperature 11a, whence it strikes collimating mirror 5. Similarly, light 2b from light source 1b passes through the slit 3b and aperature 11b, whence it strikes collimating mirror 5. In the case in which filter 4 is provided, the light 2a, 2b also passes through the filter. The light beams 6a, 6b which ensues from collimating mirror 5 impinges upon diffraction grating 7, which dissects each of the beams into its constituent wavelengths. The light spectrum 7a(1), 7a(2) which ensues from incident beam 6a then impinges upon focusing mirror 17 which directs the ensuing light 8a(1), 8a(2) to focusing lens 12. Similarly, the light spectrum 7b(1), 7b(2) which ensues from incident beam 6b then impinges upon focusing mirror 17 which directs the ensuing light 8b(1), 8b(2) to focusing lens 12. Focusing lens 12 in turn directs the light to photodiode array 9. Again, photodiode array 9 comprises a plurality of photodiodes each of which is configured to detect a different wavelength of light, and each of which produces an electrical signal which is representative of the intensity of the incoming light at that wavelength.

For the first incident spectrum 8a(1), 8a(2), the plurality of electrical signals which results, which are collectively identified with numeral 13a in the figure, is then provided to digitizer 14a. Digitizer 14a comprises electronic circuitry for amplifying and digitizing each of the electrical signals identified in the plurality 13a. The amplified and digitized signals which result, collectively identified with numeral 15a in the figure, are accessible as outputs. Similarly, for the second incident spectrum 8b(1), 8b(2), the plurality of electrical signals which results, which are collectively identified with numeral 13b in the figure, is then provided to digitizer 14b. Digitizer 14b comprises electronic circuitry for amplifying and digitizing each of the electrical signals identified in the plurality 13b. The amplified and digitized signals which result, collectively identified with numeral 15b in the figure, are accessible as outputs. Thus, it can be seen that spectrometer 16 provides, for each light source 1a, 1b, a plurality of digitized electrical signals or data, each representative of the intensity of the light from that source at a particular wavelength. Consequently, the objective of providing a spectrometer which is configured to provide multiple, simultaneous intensity spectra from independent light sources is achieved.

A second embodiment of the spectrometer of the subject invention is illustrated in FIG. 5. According to this embodiment, light 29a, 29b is provided from sources 27a, 27b, respectively. The light 29a, 29b passes through slits 28a, 28b, respectively, whence it strikes diffraction grating 30. The impinging light is divided by the diffraction grating into a corresponding spectrum of frequency or wavelength components. Thus, for light 29a, the spectrum 29a(1)-29a(2) results, while for light 29b, the spectrum 29b(1)-29b(2) results. Each of the spectra impinges on photodiode array 31 as shown. As indicated, in this embodiment, through suitable spacing between the slits 28a, 28b, substantial overlap between the spectra 29a(1)-29a(2) and 29b(1)-29b(2) is avoided. As with the previous embodiments, the photodiode array has a plurality of receptors with at least one signal line configured in a serial or parallel format. The receptors are configured such that a value is output on the at least signal line representative of the intensity of each of the frequency components of interest in the corresponding spectrum. In one implementation example, one or more digitizers, which may or may not be part of the spectrometer of the embodiment, digitize these intensity values in order to achieve a suitable interface with a computer or processor. However, it should be appreciated that examples are possible in which the one or more digitizers are avoided. Moreover, it should further be appreciated that examples are possible in which other optical components, such as aperatures, collimating mirrors, focusing mirrors, focusing lenses and the like are added.

EXAMPLE

In one implementation example, spectrometer 16 was assembled by Filmetrics, Inc., San Diego, Calif., the assignee of the subject application, in the configuration shown in FIG. 1, except that the aperatures 11a, 11b, and focusing lens 12 were omitted, and three slits were provided instead of just the two slits 13a, 3b shown in FIG. 1. In this spectrometer, the photodiode array 9 is manufactured by Hamamatsu, Part No. 3923-512Q, and the diffraction grating 7 is manufactured by Optometrics, Ayer, Mass., Part No. 33-4350. The three slits are arranged in a linear fashion along an axis in a logical extension of the configuration of FIG. 1, with a spacing between the slits of 1.9 mm. Each of the three slits is manufactured by Ocean Optics, Denedin, Fla., Part No. SLIT, and has a width of 10 microns. The wavelength region of interest depends on the desired thickness measurement range. The following table correlates the wavelength range of interest with the desired thickness measurement range:

| Wavelength Range | Thickness Measurement Range |
| --- | --- |
| 400–850 nm (visible) | 10 nm–20 $\mu$m |
| 650–1020 nm (near infrared) | 50 nm–50 $\mu$m |
| 400–1020 nm | 10 nm–50 $\mu$m |
| 215–670 nm (ultraviolet) | 3 nm–10 $\mu$m |
| 215–1020 nm | 3 nm–50 $\mu$m |

In this implementation example, the range 845–915 nm is the wavelength region of interest. Accordingly, a band pass filter having a characteristic wavelength of 845–915 nm manufactured by Coherent-Ealing, Part No. 42-7237, is used to bandlimit the light from each of the slits.

In this example, the photodiode array has 510 individual photodiode receptors, which are divided up roughly evenly amongst each of the three spectra. Consequently, each spectra in this example is allocated roughly 170 receptors.

The photodiode array integrates the current generated by the reflected light on each of the plurality of receptors. After a user-selectable integration time, the accumulated charge in each photodiode is read by a computer interfaced to the spectrometer. The integration time determines the sensitivity of the spectrometer. Too short an integration time results in a weak, noisy signal, while too long of an integration time results in a saturated signal. Adjustment of the integration time to a suitable level is possible during a set-up mode.

Due to current leakage inherent to photodiodes, each photodiode in the array charges up even when no light enters the spectrometer. In order to accurately measure the light entering the spectrometer, this "dark" reading must be subtracted from the actual measured light. To obtain this "dark" reading, the light sources providing incident light to the three slits can be momentarily turned off. The digitized output of the spectrometer then constitutes this "dark" reading. In this implementation example, a computer is provided to obtain this "dark" reading used to normalize subsequent measurements.

The computer in this implementation example is a Pentium-based 100 MHz or faster computer running Windows 95 or a later Windows platform. A parallel port is required for interfacing to the spectrometer. At least 5 MB of hard disk and 8 MB free memory are required.

Additional advantages and modifications will readily occur to those of skilled in the art. The invention in the broader aspects is not, therefore, limited to the specific details, representative methods, and illustrative examples shown and described. Accordingly, departures may be made from such details without departing form the spirit or scope of applicant's general inventive concept.

What is claimed is:

1. A compact spectrometer comprising:

first and second slits each generally arranged linearly along an axis in a plane of dispersion, and configured to simultaneously receive light reflected from respectively first and second portions of a film, the light having a plurality of diverse constituent wavelengths over a wavelength region of interest;

a diffraction grating;

at least one optical element for directing the reflected light from the first slit along an optical path to the diffraction grating, and for directing the reflected light from the second slit along an optical path to the diffraction grating, whereupon the light from the first slit impinges upon the grating and forms a first intensity spectrum in the place of dispersion, and the light from the second slit impinges upon the grating and forms a second intensity spectrum in the plane of dispersion;

a detector;

at least one optical element for directing the first intensity spectra along an optical path to a first portion of the detector, and the second intensity spectra along an optical path to a second portion of the detector, wherein the first and second intensity spectra at the detector are generally arranged side-by-side along an axis in the plane of dispersion and are substantially non-overlapping;

whereupon the detector produces a plurality of first signals, one for each wavelength of interest within the first intensity spectrum, and a plurality of second signals, one for each wavelength of interest within the second intensity spectrum;

a processor for estimating, responsive to the plurality of first signals, the thickness of the first portion of the film, and, responsive to the plurality of second signals, the thickness of the second portion of the film.

2. The spectrometer of claim 1 wherein the first and second slits are separated by a spacing which is determined so that the first and second spectra avoid substantial overlap at the detector.

3. The spectrometer of claim 1 further comprising at least one filter configured to bandlimit one or both of the first and second spectra so that the same avoid substantial overlap at the detector.

4. The spectrometer of claim 1 wherein the detector is a photodiode array.

5. The spectrometer of claim 1 wherein the detector is a CCD array.

6. The spectrometer of claim 1 wherein the diffraction grating is rotatable.

7. The spectrometer of claim 6 wherein the first and second intensity spectra are each sequentially directed to the detector.

8. The spectrometer of claim 7 wherein the detector sequentially produces each of the first and second plurality of signals.

9. The spectrometer of claim 1 wherein the plane of dispersion is a horizontal plane.

10. A compact spectrometer comprising:
   first and second slits generally arranged linearly along an axis in a plane of dispersion, and configured to simultaneously receive light reflected from respectively first and second portions of a film, the light having a plurality of diverse constituent wavelengths over a wavelength region of interest;
   a diffraction grating;
   at least one optical element for directing the reflected light from the first slit along an optical path to the diffraction grating, and for directing the reflected light from the second slit along an optical path to the diffraction grating, whereupon the light from the first slit impinges upon the grating and forms a first intensity spectrum in the plane of dispersion, and the light from the second slit impinges upon the grating and forms a second intensity spectrum in the plane of dispersion;
   a detector;
   at least one optical element for directing the first intensity spectra along an optical path to a first portion of the detector, and the second intensity spectra along an optical path to a second portion of the detector, wherein the first and second intensity spectra at the detector are generally arranged side-by-side along an axis in the plane of dispersion and are substantially non-overlapping;
   at least one filter configured to bandlimit one or more of the first and second spectra to avoid having the same substantially overlap at the detector;
   whereupon the detector produces a plurality of first signals, one for each wavelength of interest within the first intensity spectrum, and a plurality of second signals, one for each wavelength of interest within the second intensity spectrum;
   a processor for producing, responsive to the plurality of first signals, a first thickness spectrum, and, responsive to the plurality of second signals, a second thickness spectrum;
   wherein the processor further estimates, responsive to the first thickness spectrum, the thickness of the first portion of the film, and, responsive to the second thickness spectrum, the thickness of the second portion of the film.

11. The spectrometer of claim 10 wherein the detector is a photodiode array.

12. The spectrometer of claim 10 wherein the detector is a CCD array.

13. The spectrometer of claim 10 wherein the plane of dispersion is a horizontal plane.

14. The spectrometer of claim 10 wherein the diffraction grating is rotatable.

15. The spectrometer of claim 14 wherein the first and second intensity spectra are each sequentially directed to the detector.

16. The spectrometer of claim 15 wherein the detector sequentially produces each of the first and second plurality of signals.

17. A method of simultaneously estimating the thickness of a first portion of a film and a
   second portion of a film, comprising:
   simultaneously receiving, at first and second slits generally arranged linearly along an axis in a plane of dispersion, light, comprising a plurality of diverse constituent wavelengths over a wavelength region of interest, reflected from, respectively, a first portion of the film, and a second portion of the film;
   forming a first intensity spectrum from the reflected light emitted from the first slit;
   forming a second intensity spectrum from the reflected light emitted from the second slit;
   directing the first intensity spectrum to a first portion of a detector;
   directing the second intensity spectrum to a second portion of the detector, wherein the first and second intensity spectra are generally arranged side-by-side along an axis in the plane of dispersion and are substantially non-overlapping;
   producing from the detector a plurality of first signals, one for each wavelength of interest within the first intensity spectrum;
   producing from the detector a plurality of second signals, one for each wavelength of interest within the second intensity spectrum;
   estimating, responsive to the plurality of first signals, the thickness of the first portion of the film; and
   estimating, responsive to the plurality of second signals, the thickness of the second portion of the film.

18. The method of claim 17 further comprising spacing the first and second slits to prevent substantial overlap of the first and second spectra at the detector.

19. The method of claim 17 further comprising bandlimiting one or the other of the first and second intensity spectra to prevent substantial overlap thereof at the detector.

20. The method of claim 17 wherein the plane of dispersion is a horizontal plane.

* * * * *

UNITED STATES PATENT AND TRADEMARK OFFICE
CERTIFICATE OF CORRECTION

Page 1 of 1

Figure 2:
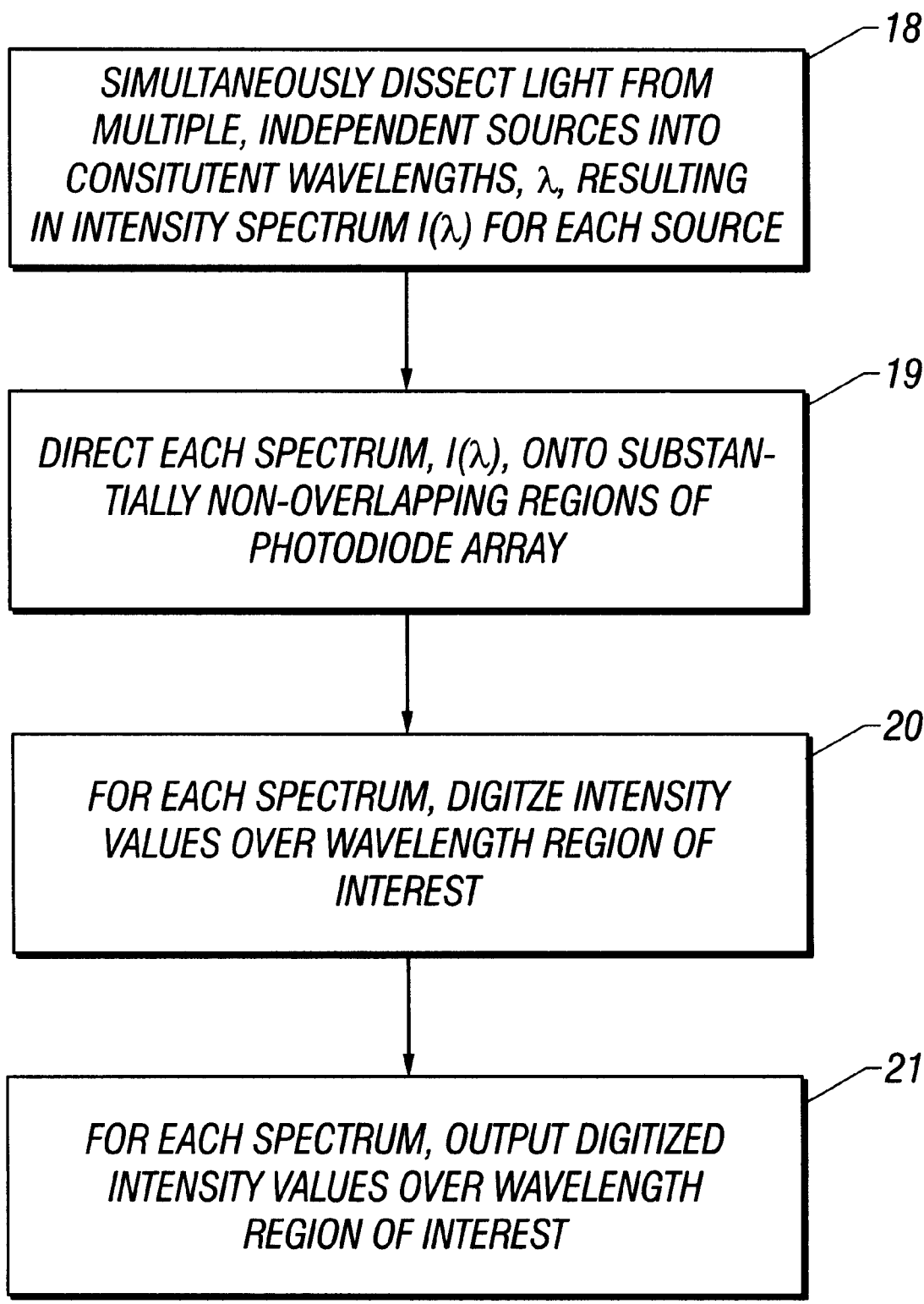
FIG. 2 illustrates a method of operation of a first embodiment of a spectrometer of the subject invention.

PATENT NO. : 6,184,985
DATED : February 6, 2001
INVENTOR(S) : Scott A. Chalmers; Randall S. Geels It is certified that error appears in the above-identified patent and that said Letters Patent is hereby corrected as shown below:

In the Drawings:

Figure 2, sheet 2 of 8, Line 3:

Delete: [CONSITUENT]
Insert: --CONSTITUENT--

Signed and Sealed this

Fifth Day of June, 2001

Attest:

Attesting Officer

NICHOLAS P. GODICI

*Acting Director of the United States Patent and Trademark Office*